United States Patent
Robertson

(10) Patent No.: US 11,590,864 B2
(45) Date of Patent: Feb. 28, 2023

(54) MOTOR VEHICLE SEAT LOCKING DEVICE

(71) Applicant: Kiekert AG, Heiligenhaus (DE)

(72) Inventor: Keith Robertson, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 228 days.

(21) Appl. No.: 16/702,637

(22) Filed: Dec. 4, 2019

(65) Prior Publication Data
US 2021/0170923 A1 Jun. 10, 2021

(51) Int. Cl.
*B60N 2/22* (2006.01)
*B60N 2/02* (2006.01)
*B60N 2/36* (2006.01)

(52) U.S. Cl.
CPC ......... *B60N 2/2227* (2013.01); *B60N 2/0232* (2013.01); *B60N 2/366* (2013.01)

(58) Field of Classification Search
CPC .... B60N 2/366; B60N 2/2227; B60N 2/0232; B60N 2002/0232; B60N 2002/0236; B60N 2/2245
See application file for complete search history.

(56) References Cited

U.S. PATENT DOCUMENTS

| | | | | |
|---|---|---|---|---|
| 4,988,134 A * | 1/1991 | Vidwans | ................. | E05B 77/12 297/378.11 |
| 7,377,584 B2 * | 5/2008 | Griswold | ............... | B60N 2/366 297/216.12 |
| 7,484,807 B2 * | 2/2009 | Okazaki | ............... | B60N 2/2245 297/378.13 |
| 7,494,187 B2 * | 2/2009 | Inoue | .................... | B60N 2/366 297/378.13 |
| 7,819,478 B2 * | 10/2010 | Griswold | ............... | B60N 2/366 297/378.13 |
| 9,090,179 B2 * | 7/2015 | Ishii | ..................... | B60N 2/2245 |
| 9,616,778 B1 * | 4/2017 | Bates | ....................... | B60N 2/36 |
| 2005/0052065 A1 * | 3/2005 | Rothstein | ............... | B60N 2/856 297/403 |
| 2010/0038948 A1 * | 2/2010 | Pigeon | ................... | B60N 2/366 297/362.11 |
| 2010/0109409 A1 * | 5/2010 | Vedder | ................... | B60N 2/366 297/367 R |
| 2010/0117425 A1 * | 5/2010 | Abe | ..................... | B60N 2/3011 296/65.01 |
| 2011/0175420 A1 * | 7/2011 | Bruck | .................. | B60N 2/2245 297/363 |
| 2014/0327266 A1 * | 11/2014 | Gholap | ................ | B60N 2/2245 296/65.16 |
| 2015/0336478 A1 * | 11/2015 | Mitsuhashi | .............. | B60N 2/20 296/65.09 |

(Continued)

FOREIGN PATENT DOCUMENTS

DE    10 2015 002 359 A1    8/2016

*Primary Examiner* — David R Dunn
*Assistant Examiner* — Christopher E Veraa
(74) *Attorney, Agent, or Firm* — Renner, Otto, Boisselle & Sklar, LLP

(57) ABSTRACT

A motor vehicle seat locking device, in particular a rear seat backrest locking device, equipped with a retaining bracket that is connected to a vehicle body and can move relative thereto, and with a catch, seat-mounted, for the retaining bracket. According to the invention, the retaining bracket is connected to a rocker that can pivot with respect to a vehicle body-mounted base, about an axis that is at a distance from the bracket.

12 Claims, 3 Drawing Sheets

(56) References Cited

U.S. PATENT DOCUMENTS

| | | |
|---|---|---|
| 2017/0151899 A1 | 6/2017 | Uehara |
| 2018/0056818 A1* | 3/2018 | Ruan .................... B60N 2/2245 |
| 2018/0111514 A1* | 4/2018 | Ruan .................... B60N 2/065 |
| 2020/0056409 A1* | 2/2020 | Ban ...................... B60N 2/015 |
| 2020/0086772 A1* | 3/2020 | Madhu .................. B60N 2/366 |
| 2020/0164776 A1* | 5/2020 | Nock .................... B60N 2/366 |
| 2020/0247283 A1* | 8/2020 | Takezaki ............... B60N 2/366 |

* cited by examiner

MOTOR VEHICLE SEAT LOCKING DEVICE

FIELD OF DISCLOSURE

The invention relates to a motor vehicle seat locking device, in particular a rear seat backrest locking device, comprising a retaining bracket, which is connected to a vehicle body and can move relative thereto, and comprising a catch, seat-mounted, for the retaining bracket.

BACKGROUND OF DISCLOSURE

Locking devices for motor vehicle seats are usually used to releasably fix or lock a backrest or seatback with respect to the vehicle body. When released or unlocked, said backrest or seatback can accordingly be folded down onto a sitting surface. In a rear seat backrest, this provides a larger trunk. This has proven itself in principle.

For this purpose, a catch that secures the retaining bracket to the vehicle body is formed so as to be fixed to the seat and can be mounted on or in said rear seat backrest, for example. Unlocking and opening the catch releases the retaining bracket and the backrest or rear seat backrest can therefore be pivoted.

In the generic prior art, for example according to US 2011/0175420 A1, the retaining bracket can move with respect to a link into different ratchet positions. The link is in turn connected to the vehicle body, for example to a C-pillar of the vehicle body or motor vehicle body. In this case, the backrest is released by operating a Bowden cable. This allows for different positions of the interior or rear seat backrest with respect to the sitting surface.

A similar procedure is carried out in US 2017/0151899 A1. Once again, this document uses actuation of a Bowden cable in order to be able to move the retaining bracket back and forth with respect to a vehicle body-mounted link into different ratchet positions.

In a comparable closure device according to DE 10 2015 002 359 A1, a rail guide apparatus having a guideway is provided. The retaining bracket can be adjusted along the guideway. In addition, an adjustment apparatus is provided. A Bowden cable is once again used here.

The prior art has proven itself in principle in regards to achieving different inclined positions of a backrest of a motor vehicle seat and in particular to providing such an adjustment possibility for a rear seat backrest. This is because the front seats generally comprise adjustment possibilities provided there. In order to provide this adjustment possibility for the rear seat backrest, too, the retaining bracket that can move with respect to the vehicle body or motor vehicle body is used. For this purpose, the retaining bracket is designed to be movable with respect to a rail, the rail in turn being connected to the vehicle body or motor vehicle body (cf. DE 10 2015 002 359 A1).

As a result, the rail in question must absorb considerable forces and pass them on to the vehicle body. A ratchet mechanism provided at this point also accordingly has to be solid (cf. DE 10 2015 002 359 A1). Furthermore, the ratchet mechanisms used thus far do not allow for sensitive backrest adjustment, since intermediate positions cannot be assumed. Lastly, operation is not convenient either. The invention intends to remedy all of this.

SUMMARY OF DISCLOSURE

The technical problem addressed by the invention is to develop such a motor vehicle seat locking device such that the backrest, and in particular the rear seat backrest of the associated motor vehicle seat, can be sensitively adjusted. In addition, the overall comfort is intended to be improved.

In order to solve this technical problem, the invention proposes that, in a generic motor vehicle seat locking device, the retaining bracket that can move with respect to the vehicle body is connected to a rocker, which can pivot with respect to a vehicle body-mounted base about an axis that is at a distance from the bracket.

In contrast to the previous and generic prior art, according to the invention the retaining bracket is therefore not moved back and forth with respect to a rail fixed to the vehicle body latched in different ratchet positions. Instead, the retaining bracket is connected to a pivotable rocker. This pivotable rocker is rotatably connected to the vehicle body-mounted base, by means of its axis that is at a distance from the bracket, i.e. an axis that is at a spacing from the retaining bracket. In other words, the base is rigidly anchored to the vehicle body, and is therefore fixed to the vehicle body. By means of the axis that is at a distance from the bracket, the rocker is now pivotally connected to said base that is mounted on the vehicle body. As a result, the rocker can execute practically any pivot angle with respect to the vehicle body-mounted base, and, unlike the vehicle body-mounted base, the retaining bracket together with the rocker can therefore also optionally assume any angular position and is not tied to a specific latching pattern, as before. This allows the inclination of the backrest of a motor vehicle seat equipped therewith to be adjusted particularly sensitively and set in practically any conceivable position.

Furthermore, this procedure makes it possible for the rocker to be equipped with a motorized drive. As a result, manual actuations carried out in the past in the prior art at this point are dispensed with by having recourse to a Bowden cable, for example. Instead, using the motorized drive, the particular angular position of the pivotable rocker can be sensitively adjusted with respect to the vehicle body-mounted base. This is particularly convenient.

In order to achieve and implement this in detail, the motorized drive is arranged on the base. In addition, the motorized drive advantageously acts on the rocker. For this purpose, the motorized drive can comprise an output that acts on the rocker and preferably a crank output, for example. By means of the output or crank output, the motorized drive acts on the rocker and ensures that the rocker assumes the desired angular position with respect to the vehicle body-mounted base. Since the retaining bracket is connected to the rocker at a distance from the axis, the retaining bracket follows the pivot movements of the rocker with respect to the base. As a result, the inclination of the backrest, and in particular the rear seat backrest, of the motor vehicle seat in question can be adjusted particularly sensitively with respect to the sitting surface. This is because, when locked, the seat-mounted catch secures the retaining bracket and therefore follows the pivot movements of the retaining bracket as per the invention.

According to an advantageous design, the motorized drive comprises an electric motor and at least one output disc. In this case, the output disc can form the crank drive. In the simplest case, the output disc intends to comprise and support a crank pin for this purpose. As a result, rotary movements of the output disc ensure that the crank pin moves towards the rocker that supports the retaining bracket, and the rocker thereby pivots with respect to the vehicle body-mounted base.

From a design point of view, the invention is advantageously further designed such that the base is formed of two parts, comprising an anchoring plate that is connected to the vehicle body and a cover plate that engages over the rocker, i.e. the anchoring plate establishes the rigid connection to the vehicle body or the motor vehicle body. For this purpose, the anchoring plate can advantageously be connected to a C-pillar of the motor vehicle body. In addition, either part or all of the motorized drive is generally connected to the anchoring plate. The cover plate provides additional stabilization.

In fact, the invention is designed such that individual pivot pins of the motorized drive that define the respective axes of rotation are fixed to both the anchoring plate and the cover plate; as a result, the motorized drive is held and effectively housed between the anchoring plate and the cover plate. This ensures that the motorized drive is fixed to the vehicle body in a particularly stable and torsion-free manner.

Potential free space between the anchoring plate and the cover plate is advantageously closed by a housing. While the anchor plate and the cover plate are made of metal, in particular steel, the housing is advantageously a plastics component, for example a plastics molded part. Ultimately, the intermediate space left between the anchoring plate and the cover plate is covered and protected against potential contaminants or environmental influences by means of the housing.

In this connection, the invention is further designed such that, together with the retaining bracket, the head of the rocker projects beyond the housing. This means that the housing between the anchoring plate and the cover plate typically comprises a slit in the head thereof, through which the rocker protrudes outwards and projects beyond the housing and consequently also the anchoring plate and the cover plate. In this case, the projecting part of the rocker supports the retaining bracket such that the retaining bracket can thereby interact with the seat-mounted catch without any problems. For this purpose, the projecting part is intended to be bent at a right angle. In addition, the slit that is usually provided in or on the head of the housing ensures that the rocker can carry out the pivot movements described and the housing likewise ensures that the motorized drive is sealed.

The retaining bracket is generally connected to the head of the rocker. In contrast, the axis of rotation of said rocker is located at the opposite end of the rocker, by means of which the rocker is pivotally connected to the vehicle body-mounted base, to be specific generally to both the anchoring plate and the cover plate. For this purpose, a pivot that defines the axis of rotation of the rocker generally penetrates both the anchoring plate and the cover plate in order to be able to ensure that the rocker is secured in a particularly stable and torsion-free manner and can move with respect to the vehicle body.

Finally, the invention has proven itself when both ends of the retaining bracket are connected to the rocker in a manner offset with respect to one another when the retaining bracket is inclined. This inclined position of the retaining bracket accounts for the corresponding inclination of the associated backrest. This means that the seat-mounted catch is also moved by the pivot movement of the rocker and consequently also of the retaining bracket. Since this joint movement takes place about the axis of rotation of the rocker on a circular arc, the retaining bracket as a whole is in an inclined position and thereby attempts to reproduce the contour of said circular arc. As a result, the force ratios between the retaining bracket and the seat-mounted catch do not change or practically do not change.

In fact, the seat-mounted catch generally comprises at least one locking mechanism made up of a catch and a pawl such that even potential inclined positions of the backrest do not cause the contact surface between the retaining bracket on the one hand and the catch on the other hand to significantly change. As a result, the seat-mounted catch operates properly and reliably.

In addition, the catch can be opened without problems, for example, in order to completely pivot the backrest or rear seat backrest downwards onto the sitting surface or to pivot it back upwards into its upright position. This can be done by an operator without problems.

Furthermore, the operator has the option of changing the inclination of the backrest or rear seat backrest particularly conveniently. For this, the motorized drive just needs to be accordingly acted upon in order to ensure that the rocker and therefore the retaining bracket are pivoted. In this case, the pivot movement of the retaining bracket is directly transferred to the catch, seat-mounted, and therefore to the backrest.

For this purpose, the inclination of the motorized drive can be changed by means of an operating button on said motor vehicle seat, for example. However, it is also possible for this to be carried out centrally by the driver. It is also possible for the inclination to be adjusted by means of a remote control and is covered by the invention.

As a result, a motor vehicle seat locking device is provided, which is particularly compact and stable. In addition, the motor vehicle seat locking device according to the invention makes it possible for the inclination of an associated backrest, in particular a rear seat backrest, to be infinitely variable. This is possible as a result of the additionally provided motorized drive for the rocker. In principle, the rocker can of course also be moved manually and purely mechanically, when necessary.

The motorized drive is routinely provided on the vehicle body and can be mounted behind a vehicle body panel, for example. In this case, the invention is based on the knowledge that enough installation space is available in the region of the C-pillar of the vehicle body, in which the motorized drive is generally mounted together with the base. In addition, a particularly compact design is observed, which has a high degree of mechanical stability. The design of the base having an anchoring plate and a cover plate and a motorized drive arranged and mounted therebetween ensures this stability. This is where the essential advantages can be found.

The invention will be explained in more detail in the following on the basis of the drawings that show just one embodiment, in which:

DETAILED DESCRIPTION

The figures show a motor vehicle seat locking device. The locking device is used for a motor vehicle seat, and in particular a rear seat, of which only a rear seat backrest 1 is shown. As will be explained in more detail in the following, the inclination of the rear seat backrest 1 can be adjusted with respect to a sitting surface 2, as shown by a double-headed arrow in FIG. 1. This means that the motor vehicle seat locking device is a rear seat backrest locking device, i.e. a device for locking the rear seat backrest 1, by means of which the inclination of the rear seat backrest 1 can be changed with respect to the sitting surface 2 and which also ensures that the rear seat backrest 1 is locked with respect to a vehicle body 4.

Figure 2:
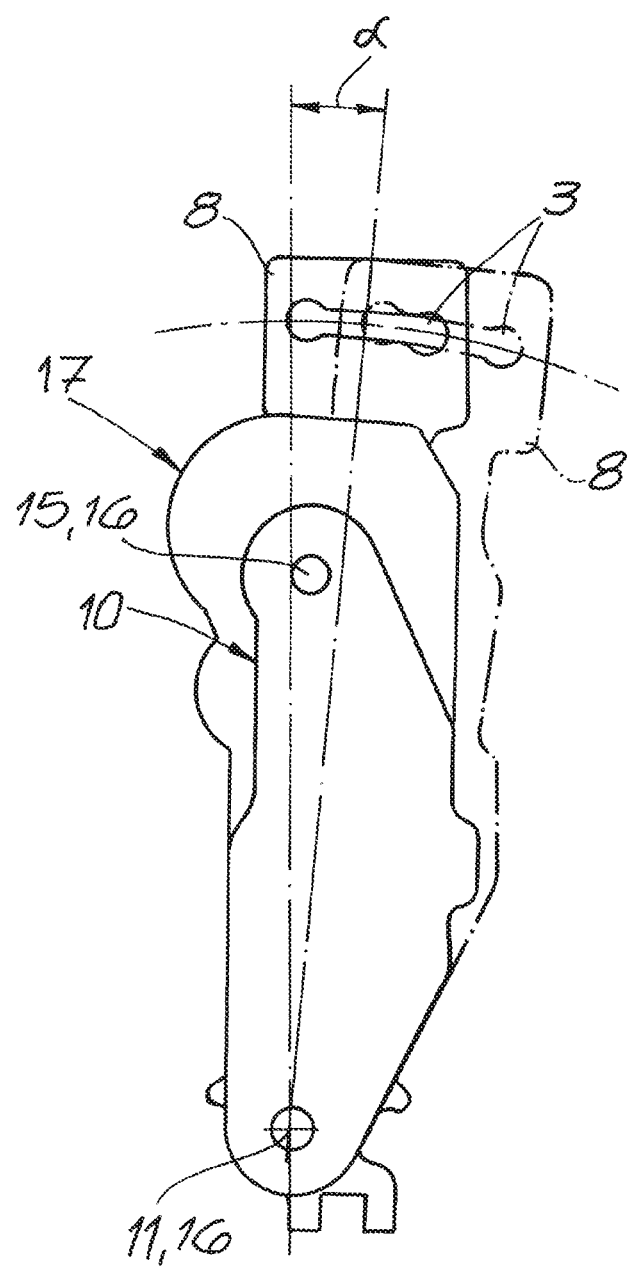
FIG. 2 is a partial view of the subject matter of FIG. 1.
Figure 3:
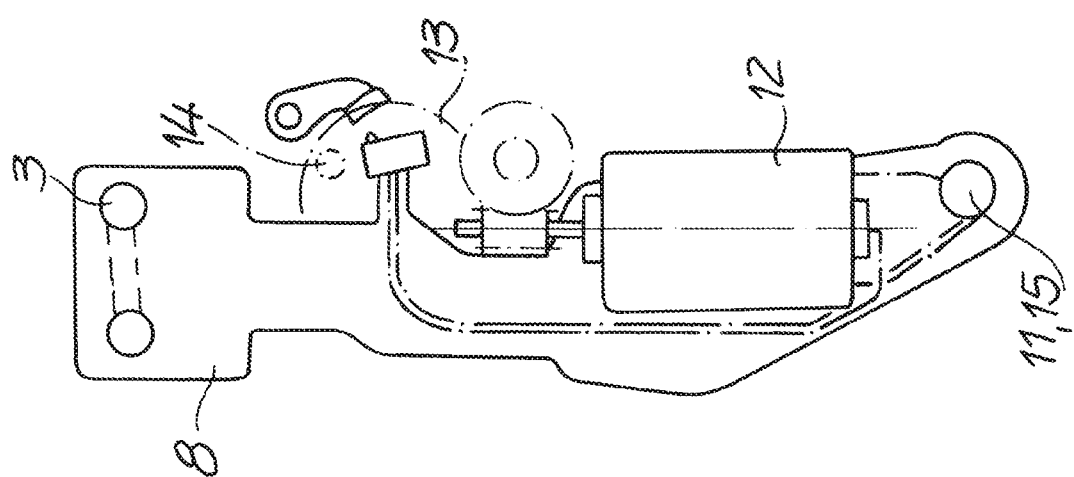
FIG. 3 shows different views of the subject matter of FIGS. 1 and 2 in the open state.
Figure 3:
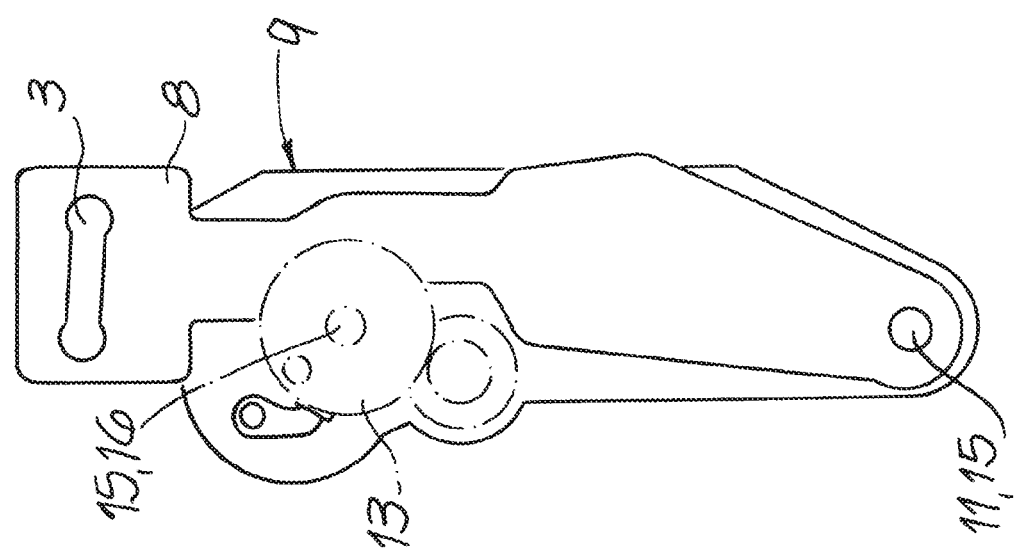

The basic structure of the motor vehicle seat locking device includes a retaining bracket 3, which can be seen in particular in FIGS. 2 and 3. The retaining bracket 3 is connected, to be specific movably connected, to the vehicle body or motor vehicle body 4, shown in FIG. 3. In this way, the desired angular position of the rear seat backrest 1 can be predetermined and set, as will be explained in more detail in the following. The retaining bracket 3 interacts with a seat-mounted catch 5.

Figure 1:
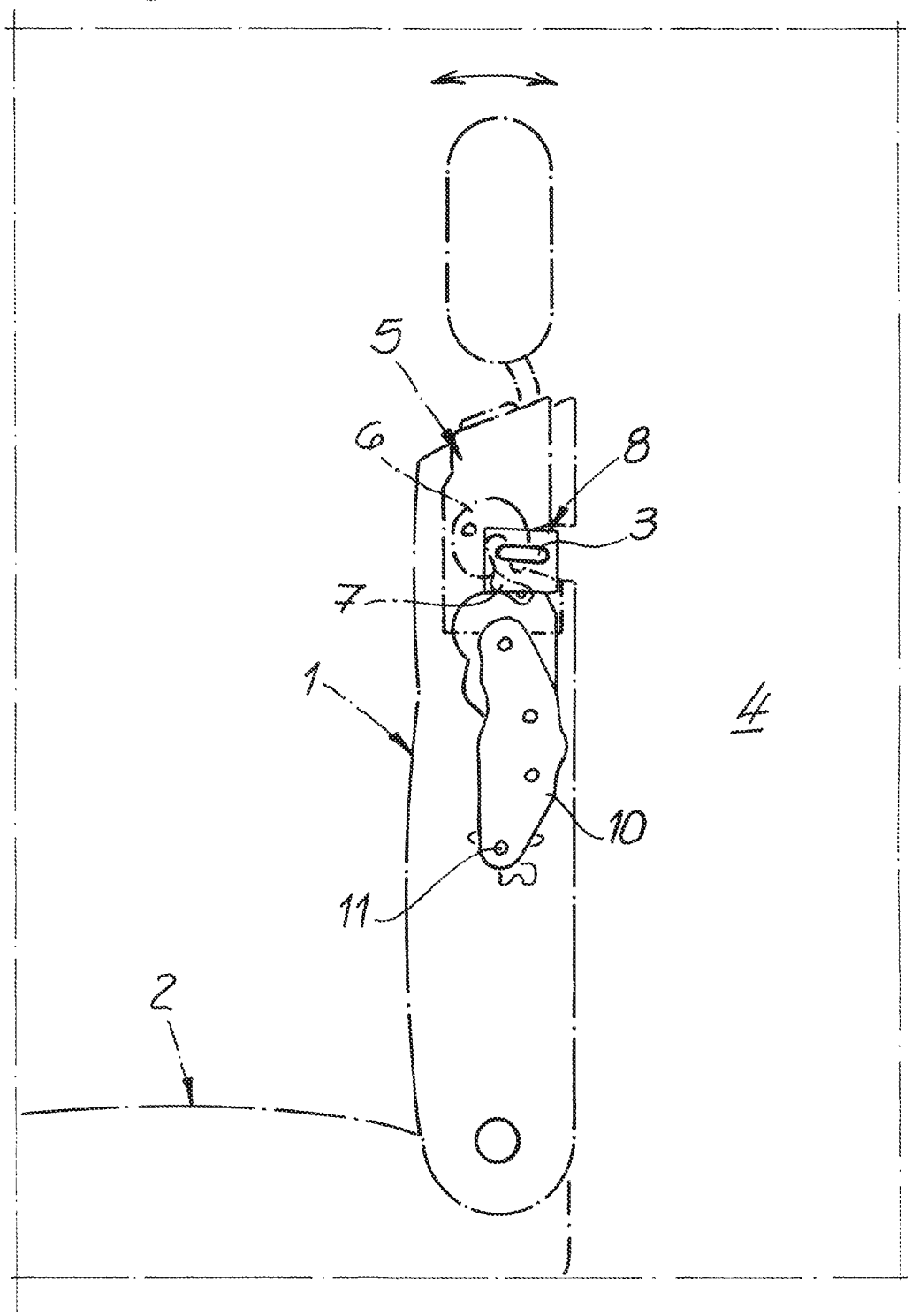
FIG. 1 is a lateral view of an overview of the motor vehicle seat locking device according to the invention.

FIG. 1 shows that the seat-mounted catch 5 seat is connected to the rear seat backrest 1. In fact, the seat-mounted catch 5 can be mounted so as to be countersunk into the rear seat backrest 1. The basic structure of the catch 5 comprises, but is not restricted to, a locking mechanism 6, 7 made up of a locking mechanism 6 and a catch 7 that interacts therewith. By means of the locking mechanism 6, 7, the retaining bracket 3 can be locked or caught, specifically when the catch 5 is closed. The open state of the catch 5 corresponds to the retaining bracket 3 being released with respect to the catch 5. As a result, in the example shown, the rear seat backrest 1 can be folded down onto the sitting surface 2 in order to increase a trunk extending behind the rear seat backrest 1, for example.

The views in FIGS. 2 and 3 show that the retaining bracket 3 according to the exemplary embodiment and according to the invention is connected to a rocker 8. The rocker 8 can be pivoted with respect to a vehicle body-mounted base 9, 10, in particular about an axis 11 that is at a distance from the bracket. This is shown in particular in FIG. 2, which shows different positions of the rocker 8 with respect to the base 9, 10. These different positions of the rocker 8 correspond to a pivot angle α in relation to the axis 11 that is at a distance from the bracket. Movements of the retaining bracket 3 about this axis 11, which is at a distance from the bracket, cause the seat-mounted catch 5, and the rear seat backrest 1 together therewith, to also be moved. This brings about the desired adjustment of the inclination of the rear seat backrest 1 with respect to the sitting surface 2.

According to the exemplary embodiment, the rocker 8 comprises a motorized drive 12, 13, 14. The motorized drive 12, 13, 14 is arranged on the base 9, 10. In fact, in the exemplary embodiment, the base 9, 10 is formed of two parts and equipped with an anchoring plate 9 that is connected to the vehicle body 4 and a cover plate 10 that engages over the rocker 8. The motorized drive 12, 13, 14 is positioned between the anchoring plate 9 and the cover plate 10 and housed between the two plates 9, 10. In addition, the invention is designed such that a plurality of pivots 15 of the motorized drive 12, 13, 14 are connected to both the anchoring plate 9 and the cover plate 10 in order to define different axes of rotation 11, 16. The axes of rotation 11, 16 in question are the axis 11 of the rocker 8 with respect to the base 9, 10, which, like the additional axis 16, is defined by means of the pivots 15 in question. The axis 16 is an axis or axis of rotation of an output disc 13 of the motorized drive 12, 13, 14.

In fact, the motorized drive 12, 13, 14 is substantially composed of an electric motor 12 and one or more output discs 13. According to the exemplary embodiment, two output discs 13 are formed, which define a step-down gear on the output side that is used to transfer rotary movements of an output shaft of the electric motor 12 to the output disc 13 and finally to a crank pin 14 that is supported by the output disc 13. As a result, the crank pin 14 can ensure the pivot movement shown in FIG. 2 of the rocker 8 by the angle α, whereby the crank pin 14 moves laterally towards the rocker 8 and pivots it about its axis 11. The output disc 13 and the crank pin 14 define a crank drive.

The anchoring plate 9 of the base 9, 10 is connected to the vehicle body or motor vehicle body 4, as can be seen in particular in FIG. 3. The motorized drive 12, 13, 14 is accommodated between the vehicle body-mounted anchoring plate 9 and the cover plate 10 that is connected to the anchoring plate 9, and is housed between the two plates 9, 10. In addition, the continuous pivots 15 that connect the two plates 9, 10 ensure that the motorized drive 12, 13, 14 arranged between the two plates 9, 10 is accommodated without torsion. Furthermore, another housing 17 is provided, which seals a free space between the two plates 9, 10 and makes sure that the motorized drive 12, 13, 14 arranged at this point is protected against dust, moisture, dirt, etc. The housing 17 comprises a slit in its head, through which the rocker 8 protrudes together with the retaining bracket 3 and which rocker can execute the pivot movements about its axis of rotation 11, shown in FIG. 2.

For this purpose, a part of the rocker 8 that projects beyond said housing 17 and therefore also the two plates 9, 10 is formed by the retaining bracket 3 provided there, which bracket passes through said slit in the housing 17. In addition, said projecting part can be bent at a right angle for the retaining bracket 3 in the direction of the seat-mounted catch 5.

Lastly, FIG. 2 shows that the retaining bracket 3 is not only connected to the head of the rocker 8, but both ends of the retaining bracket 3 are connected to the rocker 8 in a manner offset with respect to one another when the retaining bracket 3 is inclined. In this case, the inclined position of the retaining bracket 3 accounts for the pivot movement of the rocker 8, shown in FIG. 2, about its axis 11, in particular it follows the arc or circular arc described in this manner and shown in FIG. 2. As a result, the retaining bracket 3 and the seat-mounted catch 5, perfectly interact with one another, viewed over the entire pivot path of the rocker 8. In fact, the pivot path of the rocker 8 corresponds to pivot angles, taking into account an angle α of up to approximately 10° or up to approximately 20°. This is dependent on the respective circumstances and on the intended size of the desired inclination range for the rear seat backrest 1.

The motorized drive 12, 13, 14 can be operated by means of an operating button in the region of the motor vehicle seat shown in FIG. 1 and can therefore ensure that the inclination of the rear seat backrest 1 is adjusted as desired. In principle, the motorized drive 12, 13, 14 can, however, also be acted upon using a remote control. In addition, a mechanical adjustment of the rocker 8 is also conceivable and is covered by the invention.

FIG. 3 shows that the electric motor 12 acts on a first output disc by means of an output worm, which then in turn meshes with the output disc 13 that supports the crank pin 14.

Depending on the number of teeth desired in each case; a step-down ratio can thereby be achieved, which transfers the fast rotations of the output shaft of the electric motor 12 to a pivot movement of the crank pin 14, which is small in comparison. As a result, a compact electric motor 12 is also able to perform the desired inclination adjustment of the rear seat backrest 1 as requested.

LIST OF REFERENCE NUMERALS

Backrest 1
Sitting surface 2
Retaining bracket 3
Motor vehicle body 4
Catch 5
Locking mechanisms 6, 7
Pawl 7
Rocker 8
Base 9, 10
Anchoring plate 9
Cover plate 10
Axis 11
Output 12, 13, 14
Pivot 15
Axis 16
Housing 17

The invention claimed is:

1. A motor vehicle seat locking device comprising:
a retaining bracket, which is connected to a vehicle body and is movable relative thereto;
a catch, that is seat-mounted, for the retaining bracket; and
a rocker, wherein the retaining bracket is connected to the rocker that is pivotable with respect to a vehicle body-mounted base about an axis that is at a distance from the retaining bracket, wherein the rocker includes a motorized drive having an electric motor and at least one output disc,
wherein a crank pin is supported by the output disc and is configured to move laterally toward the rocker to pivot the rocker about a rotation axis of the rocker.

2. The motor vehicle seat locking device according to claim 1, wherein the motorized drive is arranged on the vehicle body-mounted base.

3. The motor vehicle seat locking device according to claim 1, wherein the vehicle body-mounted base is formed of two parts, comprising an anchoring plate that is connected to the vehicle body and a cover plate that engages over the rocker.

4. The motor vehicle seat locking device according to claim 3, wherein a housing is provided between the anchoring plate and the cover plate.

5. The motor vehicle seat locking device according to claim 4, wherein, together with the retaining bracket, a head of the rocker projects beyond the housing.

6. The motor vehicle seat locking device according to claim 3, wherein the motorized drive is positioned between the anchoring plate and the cover plate.

7. The motor vehicle seat locking device according to claim 6 further comprising a housing configured to seal a free space between the anchoring plate and the cover plate, wherein a part of the rocker projects past the housing.

8. The motor vehicle seat locking device according to claim 7, wherein the retaining bracket is connected to a head of the rocker that is arranged outside the housing.

9. The motor vehicle seat locking device according to claim 1, wherein a head of the rocker is connected to the retaining bracket, wherein the head of the rocker is opposite an end of the rocker at which the axis is arranged such that the head of the rocker has the pivoting movements about the axis.

10. The motor vehicle seat locking device according to claim 1, wherein the retaining bracket is in a locked position when the catch is in a closed position, and wherein the retaining bracket is in a released position when the catch is in an open position.

11. The motor vehicle seat locking device according to claim 1, wherein the vehicle seat locking device is arranged in a backrest and different positions of the rocker correspond to inclination of the backrest relative to a sitting surface.

12. The motor vehicle seat locking device according to claim 1, wherein the at least one output disc has a first axis of rotation that is spaced from a second axis of rotation of the rocker.

* * * * *